United States Patent
Lu et al.

(10) Patent No.: US 9,560,513 B2
(45) Date of Patent: Jan. 31, 2017

(54) METHOD AND ARRANGEMENT FOR D2D DISCOVERY

(75) Inventors: Qianxi Lu, Beijing (CN); Gabor Fodor, Hässelby (SE); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/387,447

(22) PCT Filed: May 4, 2012

(86) PCT No.: PCT/SE2012/050469
§ 371 (c)(1),
(2), (4) Date: Sep. 23, 2014

(87) PCT Pub. No.: WO2013/165291
PCT Pub. Date: Nov. 7, 2013

(65) Prior Publication Data
US 2015/0094057 A1    Apr. 2, 2015

(51) Int. Cl.
*H04W 8/00* (2009.01)
*H04W 76/02* (2009.01)
*H04W 16/30* (2009.01)
*H04W 72/04* (2009.01)
*H04W 4/02* (2009.01)

(52) U.S. Cl.
CPC .......... *H04W 8/005* (2013.01); *H04W 16/30* (2013.01); *H04W 72/04* (2013.01); *H04W 76/023* (2013.01); *H04W 4/02* (2013.01)

(58) Field of Classification Search
None
See application file for complete search history.

(56) References Cited

U.S. PATENT DOCUMENTS

| 2009/0013081 A1 | 1/2009 | Laroia et al. |
| 2010/0190509 A1* | 7/2010 | Davis ............. H04W 56/006 455/456.1 |
| 2015/0063095 A1* | 3/2015 | Deng ............... H04W 8/005 370/221 |

FOREIGN PATENT DOCUMENTS

| WO | WO 2010/139847 | 12/2010 |
| WO | WO 2011/069295 | 6/2011 |
| WO | WO-2012/019349 | * 2/2012 ............. H04W 16/02 |
| WO | WO 2012/019349 | 2/2012 |

OTHER PUBLICATIONS

PCT International Search Report for International application No. PCT/SE2012/050469, Apr. 15, 2013.

* cited by examiner

*Primary Examiner* — Leon-Viet Nguyen
(74) *Attorney, Agent, or Firm* — Baker Botts, LLP

(57) ABSTRACT

According to a first aspect of embodiments herein, the object is achieved by a method in a base station for handling a process of discovering a candidate user equipment for Device to Device, D2D, communication in a cell. The cell is served by the base station. The base station divides (200) the cell into a number of regions. The base station then assigns (201) to each one out of the number of regions, a channel resource for use in the region. The channel resource is for sending beacon signals in the process of discovering the D2D candidate user equipment.

22 Claims, 11 Drawing Sheets

METHOD AND ARRANGEMENT FOR D2D DISCOVERY

PRIORITY

This nonprovisional application is a U.S. National Stage Filing under 35 U.S.C. §371 of International Patent Application Serial No. PCT/SE2012/050469, filed May 4, 2012 and entitled "Method and Arrangement for D2D Discovery."

TECHNICAL FIELD

Embodiments herein relate to a base station, a first user equipment, a second user equipment and methods therein. In particular, it relates to handling a process of discovering a candidate user equipment for Device to Device (D2D) communication in a cell.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeS", "B node", Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

D2D Communication

Recent developments of the 3GPP Long Term Evolution (LTE) facilitate accessing local IP based services in a home, an office, a public hot spot or even outdoor environments. One of the important use cases for a local IP access and local connectivity involves the direct communication between devices such as user equipments in the close proximity of each other, typically less than a few 10 s of meters but sometimes up to a few hundred meters.

This direct mode or Device-to-Device (D2D) enables a number of potential gains over the traditional cellular technique where two devices communicates vi a cellular access point such as e.g. a base station because D2D devices are often much closer to one another than the cellular devices that have to communicate via the cellular access point.

One gain is capacity gain which may comprise reuse gain and hop gain. Regarding the reuse gain, D2D communication may provide reuse of radio resources such as e.g. Orthogonal Frequency Division Multiplex (OFDM) resource blocks, reuse gain. Regarding the hop gain, D2D communication provides a D2D link providing a single hop between the transmitter and receiver points as opposed to the 2-hop link via a cellular access point.

Another gain is peak rate gain, which may comprise proximity gain. D2D communication may further provide high peak rates due to the proximity and potentially favorable propagation.

A further gain is latency gain. When the UEs communicate over a D2D link, base station forwarding is short cut and the end-to-end latency can decrease.

The first step in the establishment of a D2D link is that the devices discover the presence of their peer. During the discovery process, one device is assumed to be in D2D slave role, and the other user equipment in D2D master role. To implement peer discovery, the D2D master device broadcasts signals, indicating its capability to provide certain service, and the D2D slave device tries to discover the D2D master device which may provide a required service. These signals that the master device broadcasts are referred to as beacon signals. Note that a single device may play both roles, i.e. master and slave in different occasions, or even simultaneously.

In order to broadcast the beacon signals, master devices use so called Peer Discovery Resources (PDR). In prior art systems, such as e.g. Bluetooth™, the PDR are made up channel of resources such as time and frequency channel resources. The notion of PDR is also used in other systems such as the FlashLinQ system provided by Qualcomm. FlashLinQ enables devices to discover each other automatically and continuously, and to communicate, peer-to-peer, at broadband speeds without the need for intermediary infrastructure. Generally, when multiple master devises broadcast beacon signals that use the same or overlapping PDR:s, it is referred to as a PDR collision. When a PDR collisions occur, the performance of the discovery procedure typically deteriorates. In order to avoid collisions existing systems may use, for example, frequency hopping used in Bluetooth or other distributed randomized schemes.

Embodiments herein generally relates to a D2D peer discovery scheme in a cellular based network such as e.g., LTE. Different from pure distributed network, in the case of infrastructure-assisted D2D, the cellular network may mediate in the discovery process by recognizing when two devices have a reasonable chance of successful D2D link establishment, and coordinating the time and frequency allocations for sending/scanning for beacons.

RSRP Measurement and Uplink TA Procedure in LTE

In existing systems, such as the 3GPP LTE system, there are standardized procedures and measurements that allow the radio access network such as the base stations, to manage handovers, set a user equipment transmit power and control link adaptation, and coding scheme selection by the user equipment. The following components of these procedures and measurements are referred to herein. LTE is used as an example, but the person skilled in the art will recognize that similar measurements and associated procedures are defined for other cellular systems, such as GSM, WCDMA, HSPA or WiMax.

The cellular base station periodically transmits i.e. broadcasts, DownLink (DL) Reference Signals (RS) with known transmit power levels and characteristics. For example, in LTE the RS sequence carries unambiguously the cell identity.

The user equipments in the cell served by that base station perform measurements on the received RS. For example, in LTE the user equipments perform a measurement referred to as Reference Signal Received Power (RSRP). The RSRP is defined as the linear average in Watts of the DL RS across a channel bandwidth of the cell.

Typically, the user equipments in the cell are configured by the base station to report some of the results of their measurements, including the RSRP measurements. In fact, the user equipment may report on the RSRP measurements from multiple cells, not only the cell that the user equipment is camping on, in order to help the base station to build an understanding of the radio position of the user equipment.

Another procedure of relevance in the current context is the uplink Timing Alignment (TA) procedure. The purpose of the TA procedure is to ensure that a user equipment's uplink transmissions arrive at the base station without overlapping with the UL transmissions from other user equipments. TA is controlled by the base station by configuring a timing advance quantity at the user equipment transmitter, which indicates to the user equipment the relative time relative to the received DL timing. In essence, timing advance is an offset, at the user equipment, between the start of a received downlink subframe and a transmitted uplink subframe. In LTE, the granularity of the TA parameter is 0.52 micro seconds and may be a maximum of 0.67 ms. When the user equipment is close to the base station, the TA may be set to 0, while the maximum value corresponds to about 100 km cell radius.

The updates of the TA to counteract the effects of user equipment mobility, changes in the propagation environment, etc, are performed by a closed loop mechanism between the user equipment and the base station. The closed loop mechanism means that the base station measures the received UL timing of user equipment data transmissions and issues TA update commands to instruct the user equipment to adjust its transmission timing accordingly.

As a summary, in existing systems, the user equipment and base station continuously performs measurements. The measurement results allow the base station to continuously have knowledge about the user equipments relative "radio distance" or "radio position" in the cell, e.g. in terms of path loss, multicell geometry and the received UL timing of UL transmissions and corresponding TA value calculated by existing methods.

In US 2009/0013081 A1 a D2D Peer Discovery (PD) scheme is disclosed, which is implemented in an autonomous way, Autonomous Peer Discovery (APD). That is, without any control from a central point such as e.g., an access point or base station. A challenge in this scenario is how to enable two peer devices nearby each other to meet in time and frequency. Without any co-ordination, this is only possible via a randomized procedure such that the peers sending and scanning for beacons at different times and/or frequencies, after a certain amount of time discover each other with high probability. Two drawbacks of this scheme are as follows.

It requires lots of PD Resources (PDR) available for a master device, within which some are chosen for beacon broadcasting randomly. To avoid beacon transmission collision from multiple master devices, there should be a large number of PDR available, so it is not resource efficient.

To catch the possible beacon transmission in these many resources, the slave devises have to monitor all PDRs, which is not power efficient.

A possible solution to increase the resource and power efficiency may be to assign PDRs in a scheduled way, i.e., network-assisted PD, e.g., Location information based PD (LPD). A master device informs the network which services it offers. This information changes rather infrequently and the corresponding update rates are low. In addition, the device also provides its position to the network. The network transmits the location information of master devices together with a service identifier (e.g. expression) to slave devices, either via broadcast and/or unicast. If unicast is used, a slave device can be updated with location information of nearby master devices only. In this case even slave devices need to provide the network with their position to enable the network to filter out far away master devices. A slave device may even inform the network which services it is interested in to further reduce potential master devices Since this method requires a slave device to keep monitoring location information using, for example, Global Positioning System (GPS), it would cause extra user equipment power consumption due to GPS signal reception. Other positioning technologies involve the continuous reception of technology specific signals implying a similar problem.

Further, since this method requires all user equipments, masters and slaves to report the location information to the base station with certain cycle, and the base station would send these information to all interested neighboring slave devices, it would cause large signalling overhead, especially when performed via user equipment specific signaling.

SUMMARY

It is therefore an object of embodiments herein to provide a way of improving the process of discovering devices for D2D communication.

According to a first aspect of embodiments herein, the object is achieved by a method in a base station for handling a process of discovering a candidate user equipment for Device to Device, D2D, communication in a cell. The cell is served by the base station. The base station divides the cell into a number of regions. The base station then assigns to each one out of the number of regions, a channel resource for use in the region. The channel resource is for sending beacon signals in the process of discovering the D2D candidate user equipment.

According to a second aspect of embodiments herein, the object is achieved by a method in a first user equipment for handling a process of discovering a candidate user equipment for Device to Device, D2D, communication in a cell. The first user equipment may be a master device. The cell is divided into a number of regions. The first user equipment sends an indication to the base station. The indication indicates that the first user equipment has D2D capability. The first user equipment receives a first table from the base station when the base station has received the indication. The first table comprises, for each region out of the number of regions, an assigned channel resource to use in that region. The first user equipment selects from the first table, a channel resource that is assigned to a first region out of the number of regions. The first region is associated with the geographical position of the first user equipment. The first user equipment then sends a beacon signal on the selected channel resource. The beacon signal is to be received by a second user equipment. The beacon signal is sent to announce that the first user equipment is a candidate user equipment for D2D communication.

According to a third aspect of embodiments herein, the object is achieved by a method in a second user equipment for handling a process of discovering a candidate user equipment for Device to Device, D2D, communication in a cell. The cell is divided into a number of regions. The second user equipment may be a slave device. The second user equipment receives a first table from a base station. The first table comprises for each region out of the number of regions, an assigned channel resource to use in that region. The second user equipment selects from the first table, a channel resource that is assigned to a first region out of the number of regions. The first region is associated with the geographical position of the second user equipment. The second user equipment the monitors the selected channel resource to discover a beacon signal from a first user equipment. The beacon signal announces that the first user equipment is a candidate user equipment for D2D communication.

According to a fourth aspect of embodiments herein, the object is achieved by a base station for handling a process of discovering a candidate user equipment for Device to Device, D2D, communication in a cell. The cell is served by the base station. The base station comprises a dividing circuit configured to divide the cell into a number of regions. The base station further comprises an assigning circuit configured to assign to each one out of the number of regions, a channel resource for use in the region for sending beacon signals in the process of discovering the D2D candidate user equipment.

According to a fifth aspect of embodiments herein, the object is achieved by a first user equipment for handling a process of discovering a candidate user equipment for Device to Device, D2D, communication in a cell. The cell is arranged to be divided into a number of regions. The first user equipment comprises a sending circuit configured to send an indication to the base station. The indication indicates that the first user equipment has D2D capability. The first user equipment further comprises a receiving circuit configured to receive from the base station when the base station has received the indication, a first table comprising, for each region out of the number of regions, an assigned channel resource to use in that region. The first user equipment further comprises a selecting circuit configured to select from the first table, a channel resource that is assigned to a first region out of the number of regions. The first region is associated with the geographical position of the first user equipment. The sending circuit is further configured to send a beacon signal on the selected channel resource. The beacon signal is to be received by a second user equipment. The beacon signal is sent to announce that the first user equipment is a user equipment candidate user equipment for D2D communication.

According to a sixth aspect of embodiments herein, the object is achieved by a second user equipment for handling a process of discovering a candidate user equipment for Device to Device, D2D, communication in a cell. The cell is divided into a number of regions. The second user equipment comprises a receiving circuit configured to receive a first table from a base station. The first table comprises for each region out of the number of regions, an assigned channel resource to use in that region. The second user equipment further comprises a selecting circuit configured to select from the first table, a channel resource that is assigned to a first region out of the number of regions. The first region is associated with the geographical position of the second user equipment. The second user equipment further comprises a monitoring circuit configured to monitor the selected channel resource to discover a beacon signal from a first user equipment. The beacon signal announces that the first user equipment is a candidate user equipment for D2D communication.

Since the cell is divided into regions and each region is assigned a respective channel resource for beacon signalling, and further since the first and second user equipment are informed about the assigned channel resources in the respective region, the first and second user equipment only need to send and monitor beacon signals using channel resources in the region where the respective first and second user equipment are located in. This implies that there is no need to monitor all the Peer Discovery Resources, PDR, which save the user equipment time and energy in the slave user equipments. In this way the process of discovering devices for D2D communication has been improved.

BRIEF DESCRIPTION OF THE DRAWINGS

Examples of embodiments herein are described in more detail with reference to attached drawings in which.

DETAILED DESCRIPTION

Embodiments herein generally relates to a D2D peer discovery scheme in a cellular based network.

A concept of embodiments herein is a combined Location based Peer Discovery (LPD) and Autonomous Peer Discovery (APD) type of peer discovery procedure, which overcomes the drawbacks of prior art and which may be divided into the following aspects. According to embodiments herein, a cell coverage area is divided into small regions. Collision may be avoided between regions close to each other, while reuse of PD resources may be allowed between regions far from each other. As a complement, intra-region collision may be reduced by a re-active scheme.

Figure 1:
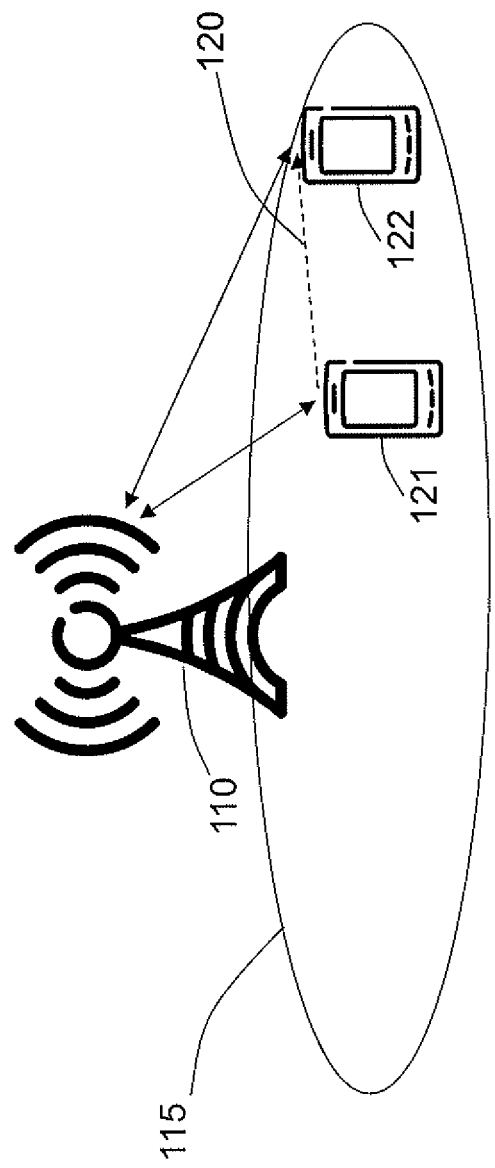
FIG. 1 is a schematic block diagram illustrating embodiments in a cellular communications network.

FIG. 1 depicts a cellular communications network 100 in which embodiments herein may be implemented. The cellular communications network 100 is a wireless communication network such as an LTE, WCDMA, GSM network, any 3GPP cellular network, Wimax, or any cellular network or system.

The cellular communications network 100 comprises a plurality of base stations whereof one, a base station 110 is depicted in FIG. 1. The base station 110 may be a radio base station such as e.g. an eNB, an eNodeB, or an Home Node B, an Home eNode B or any other network node capable to serve a user equipment or a machine type communication device in a cellular communications network. The base station 110 is serving a cell 115.

A number of user equipments are located in the cell 115 served by the base station 110. Any of these user equipments may have the role of being a master device or a slave device. These roles will be further discussed below. In the example scenario of FIG. 1, only two user equipments are shown in the cell 115. One of them is a first user equipment 121 which in this example scenario has the role of a master device. The first user equipment 121 is configured to transmit beacon signals 120. The beacon signals are transmitted so that slave devices in the vicinity shall be able to hear the beacon signals to discover a master device for D2D communication.

A second user equipment 122 is located in the cell 115 which in this example scenario has the role of a slave device. The second user equipment 122 is configured to receive beacon signals from master devises in the vicinity. This means that the second user equipment 122 may receive i.e. listen for beacon signals transmitted by a master device such as e.g. the first user equipment 121, and other master devices (not shown) for discovering a master device that the second user equipment 122 can communicate with, using D2D communication.

The first user equipment 121 and the second user equipment 122 are capable of communicate with other master or slave devices in their respective vicinity using D2D communication. The first user equipment 121 and the second user equipment 122 are further capable of accessing the cellular communications network 100 via the base station 110 when they are located in the cell 115. The first user equipment 121 and the second user equipment 122 may e.g. be mobile terminals or wireless terminals, mobile phones, computers such as e.g. laptops, Personal Digital Assistants (PDAs) or tablet computers, sometimes referred to as surf plates, with wireless capability, or any other radio network units capable to communicating over a radio link in a cellular communications network.

Master and Slave Roles of Devices

When a user equipment broadcasts a beacon signal to allow other user equipments to discover it, the user equipment sending the beacon is referred to as a master device such as the first user equipment 121, and the user equipment receiving the beacon is referred to as a slave device such as the second user equipment 122. Sending beacon signals by the first user equipment 121 being a master device allows the second user equipment 122 being a slave device to discover the first user equipment 121 for possible D2D communication. This is e.g. done in order to let the second user equipment 122 be aware that the user equipment 122 can provide some service that may be interesting for the second user equipment 122. Note that in some embodiments a single node, for example a user handheld device such as a smart phone, may play the master and the slave roles simultaneously.

User equipments such as the first user equipment 121 and the second user equipment 122 in FIG. 1, attempt to discover user equipments in a local range that can provide a given type of service. The first user equipment 121 may make use of some D2D technology and broadcast a beacon signal 120 which may be received by a peer such as the second user equipment 122, thereby enabling device discovery. There may be multiple D2D technologies in operation which may carry a beacon signal 120. Possible options include 802.11 WLAN, Bluetooth, or a possible future D2D extension of LTE, or other technologies such as the wireless sense technology. There may be more than one D2D technologies in operation in the same network, possibly using different spectrum bands or carrier frequencies, and user equipments may have varying capabilities to support one or several of them.

Embodiments of a Method Seen from a Base Station 110 View

Figure 2:
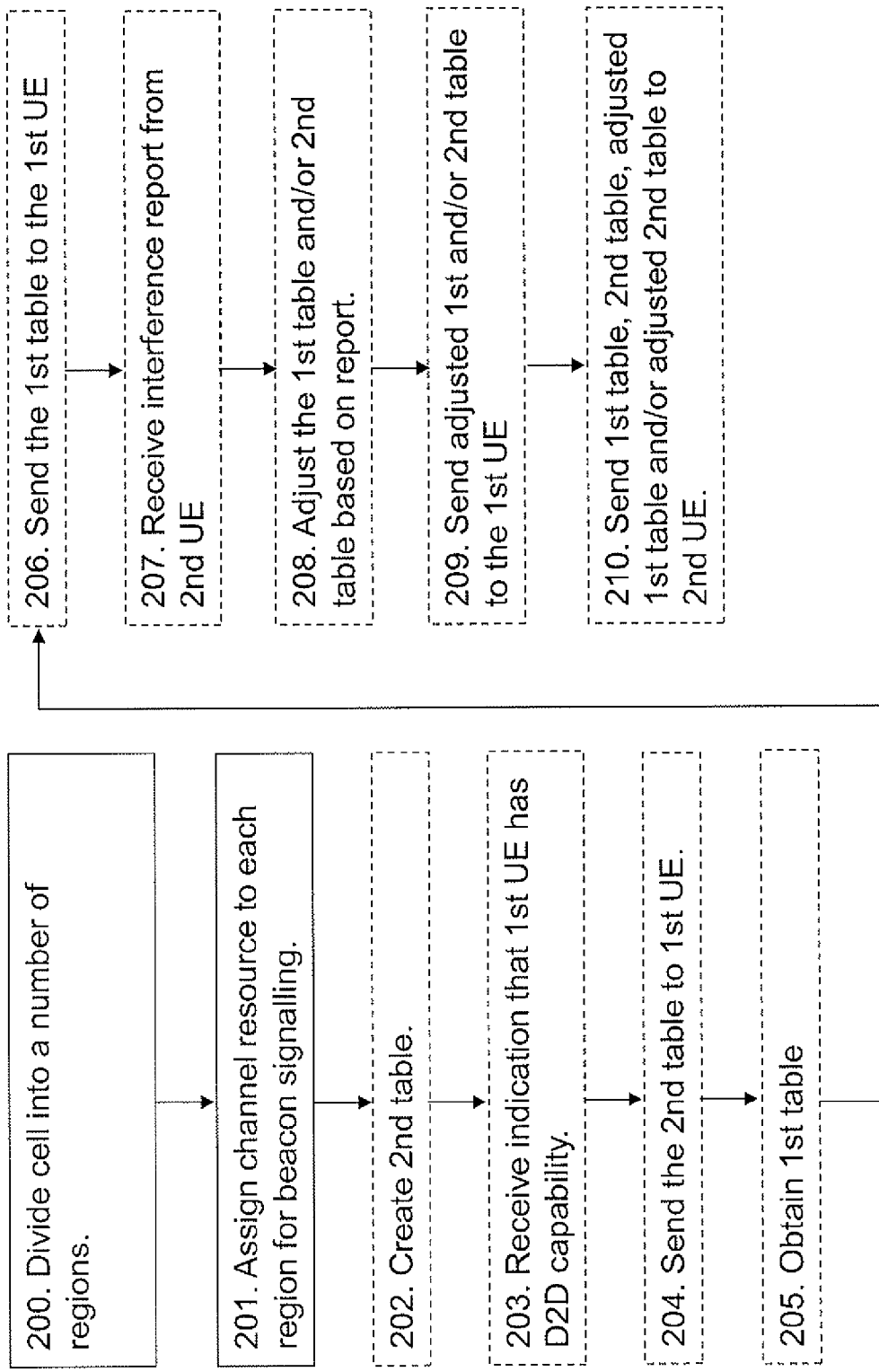
FIG. 2 is a flowchart depicting embodiments of a method in a base station.

Firstly, in FIG. 2, embodiments of a method will be described when seen from a base station 110 view. Afterwards, embodiments of a method when seen from the first user equipment 121 view (FIG. 8) and embodiments of a method when seen from the second user equipment 122 view (FIG. 10) will be described.

Thus, example of embodiments of a method in a in the base station 110 for handling a process of discovering a candidate user equipment for D2D communication in a cell 115, will now be described with reference to a flowchart depicted in FIG. 2. As mentioned above, the cell 115 is served by the base station 110. The method comprises the following actions, which actions may be taken in any suitable order. Dashed lines of some boxes in FIG. 2 indicate that this action is not mandatory.

Action 200

To improve the process of discovering devices for D2D communication by increasing the resource and power efficiency, the base station 110 first divides the cell 115 into a number of regions. The number of regions may be one, i.e. one cell may be one region, different cells can be different regions.

This dividing may be based on information about timing advance in the cell 115 and information about reference signal received power of the cell 115. As an alternative the dividing may be based on positioning information obtained by monitoring GPS signals or Positioning information received from user equipments in the cell monitoring GPS signals.

The dividing of the cell 115 into the number of regions, may be performed such that a coverage area of the cell 115 is divided into sectorized rings, wherein each sectorized ring represents a region.

The number of regions that the cell 115 is divided into may be based on and/or revised based on the number of user equipments in the cell 115 from which the base station 110 has received an indication of having D2D capability.

Thus, the base station 110 divides the cell 115 coverage area into multiple small regions such as e.g. sectorized rings. How this is action is performed will be described more in detail below.

Action 201

The base station 110 then assigns to each one out of the number of regions, a channel resource for use in the region for sending beacon signals in the process of discovering the D2D candidate user equipment. The term "channel resource for sending beacon signals" may also be referred to as PDR.

In some embodiments the assigning is performed such that different channel recourses are assigned to colliding regions out of the number of regions. The assigning 201 may further be performed such that same channel recourses are assigned to not colliding regions out of the number of regions. This may imply a resulting in a number of available channel recourses in the cell 115 that are less than the number of regions.

The channel resources may be PDR and may be made up by time and frequency channel resources The same channel resources are assigned to not colliding regions out of the number of regions, which means that the channel resources may be reused and resource efficiency is improved. The slave devices in one region only needs to monitor some POR related to the region and does not need to monitor all the PDRs, which can time and energy.

Action 202

To facilitate the discovery process, the base station 110 may obtain a first table and create a second table.

In this action according to some embodiments, the base station 110 creates the second table. The second table comprises, for each region out of the number of regions, an indication of a border line of the region. This may be used by the first user equipment 121 and/or second user equipment 121 to identify which region they are located in, see actions below. The second table may be a predefined table which in some embodiments are maintained by a RAN. The second table may be referred to as a Region Division Table (RDT) and may comprise the coordinates of the boarder lines of each region and its associated region identity. With the identity, the user equipments know the set of PDRs that are allowed to be used within the region. The second table thus allows a user equipment which has received the second table to map its geographical position to a region identity.

Action 203

The first user equipment 121 may wish to announce to the base station that it has D2D capability. This means e.g. that the first user equipment 121 has capability to send beacon signals. The base station 110 receives an indication that the first user equipment 121 has D2D capability. During user equipment register or when the device wants to start the D2D service, the first user equipment 121 may send the capability to the network, i.e. the base station 110.

Action 204

In the embodiments where the second table has been created, the base station 110 may send the second table to the first user equipment 121. This may be performed when the base station 110 has received an indication that the first user equipment 121 has D2D capability. This may e.g. be performed by broadcasting, and e.g. at the same time as the first table. This means that in some embodiments, before the first user equipment 121 acts as a master for the peer discovery procedure, the base station 110 sends the second table to the first user equipment 121, if the first user equipment 121 has indicated D2D capability. Thus, in these embodiments this signalling only concerns D2D capable user equipments. An advantage with this is that no additional signaling for non-D2D user equipments is required.

Action 205

The base station 110 may obtain the first table comprising, for each region out of the number of regions, an indication of the assigned channel resource to use in that region for the process of discovering the D2D candidate user equipment. This first table may be used by the first user equipment 121 and/or second user equipment 121 to identify which assigned channel resource to use when they have identified which region they are located in, see actions below. The first table may be predefined and may be maintained by the RAN. The first table may be referred to as a Peer Discovery Resources (PDR) table. The first table may specify the set of assigned channel resources that are allowed to be used within a region, which may be identified by a region identity.

Action 206

In order to avoid inter-region channel resource collision, the neightbour/colliding region do not use the same set of assigned channel resource.

The first table may be pre-configured which means that it will not be sent during the peer discovery period. In some embodiments, the base station 110 may send the first table to the first user equipment 121 when the base station 110 has received an indication that the first user equipment 121 has D2D capability. This may e.g. be performed by broadcasting. This means that in some embodiments, before the first user equipment 121 acts as a master for the peer discovery procedure, the base station 110 sends the first table to the first user equipment 121, if the first user equipment 121 has indicated D2D capability. Thus, in these embodiments this signalling only concerns D2D capable user equipments. The first table may comprise a list of region—valid channel resource set association.

Action 207

It is an advantage to detect intra-region channel resource collision for beacon signalling to be able to solve this problem. Thus, when there is one or multiple collisions between two or more master devices detected by a slave, such as the second user equipment 122, the second user equipment 122 reports it to its serving base station 110. The first user equipment may be one of the colliding master devices. Therefore in some embodiments, the base station 110 receives a report from the second user equipment 122, i.e. a slave device, comprised in the cell 115. The report comprises information about two or more user equipments colliding by using the same channel resource for sending beacon signals within the same region.

Action 208

In the embodiments where the report about colliding has been received, the base station 110 may adjust the first table and/or the second table based on the information in the received report. This is to prevent upcoming intra-region PDR collision.

In some embodiments, the adjusting of the first table and/or the second table comprises increasing the number of available channel recourses in one of the regions out of out of the number of regions in the cell 115.

The adjusting of the first table and/or the second table may comprise dividing the cell 115 into an increased number of regions.

Action 209

To mitigate intra-region collision, the base station 110 may send e.g. by broadcasting a revised first table and/or second table to all D2D user equipment, to inform of an adjustment of regions, borderlines of regions, and/or associated channel resources to be used in the interfered regions and all regions if they are affected. This may e.g. be a PDR set adjustment of this colliding region, e.g., increase the available PDRs, to reduce collision probability. In this way, the intra-region PDR collision is avoided/reduced in a re-active way. Accordingly, when any of the first table and the second table has been adjusted, the base station 110 may send the adjusted first table and/or the adjusted second table to the first user equipment 121. This may be sent to the user equipments from which the base station 110 has received an indication that the first user equipment 121 has D2D capability.

Action 210

In some embodiments, the base station 110 sends, any one out of the first table, the second table, the adjusted first table and/or the adjusted second table to the second user equipment 122 slave. This may also e.g. be performed by broadcasting. Or this may be signaled to the second user equipment 122 who is using D2D in this area.

The following description may be applicable to any suitable embodiments herein.

Dividing into Regions

As mentioned above the base station 110 divides the cell 115 coverage area into a number of regions. This may be performed by using an Reference Signal Received Power (RSRP)+Timing Advance (TA) based region division: Embodiments herein provides a location-based peer discovery resources usage in a power efficient way. A GPS based method may also be used, but requires extra power consumption due to the user equipments monitoring of GPS signals. Therefore it is an advantage to utilize the existing cellular RSRP and TA information, both of which are needed for regular cellular data transmissions. RSRP and TA may be adopted as follows.

Figure 3:
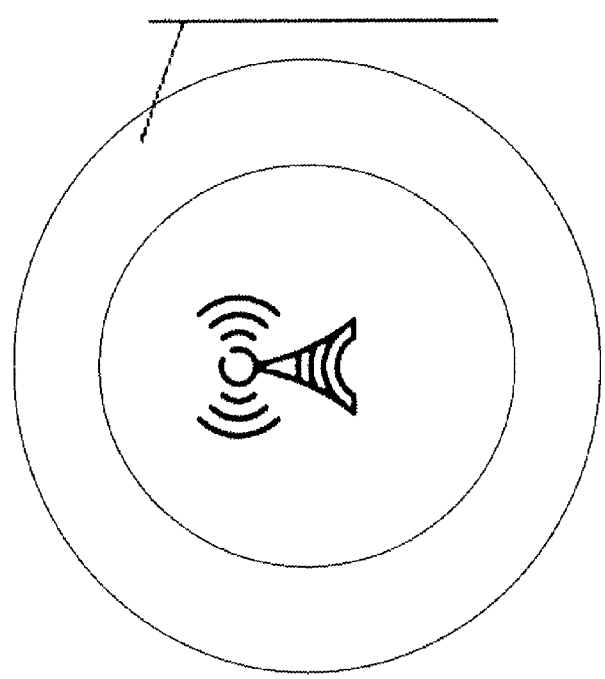
FIG. 3 is a schematic block diagram illustrating embodiments in a cellular communications network.

The longer the distance between the first user equipment 121 or any user equipment and base station 110, the larger TA is used by the first user equipment 121 for uplink transmission as described above, under background. Accordingly, the TA information is used to derive the distance from the first user equipment 121 to the serving cell and the base station 110. Hence, specific TA region value may define a doughnut, i.e. a broad circle around the base station 110, i.e. the "radius" of a region which may be known by the first user equipment 121 accordingly. The specific TA value region may define one of the regions that the cell 115 is divided into. This is shown in FIG. 3 which is a figure that illustrates a region division of the first base station 110 based on TA when divided into two regions.

Figure 4:
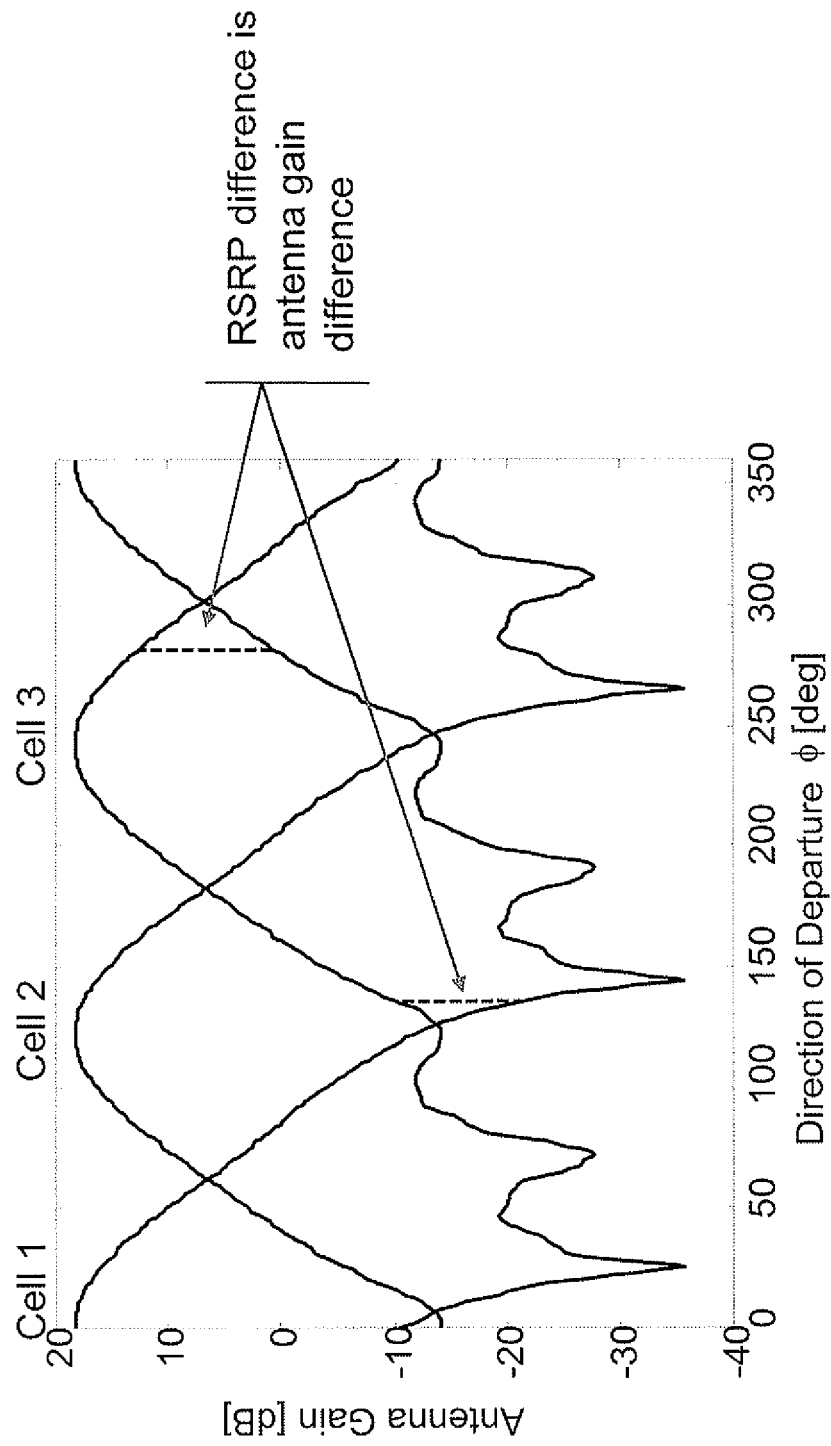
FIG. 4 is a schematic diagram illustrating embodiments in a cellular communications network.

FIG. 4 shows the antenna gain of the base station 110 when being a three sector base station. The x-axis represents Direction of degradation of the antenna of the base station 110 The y-axis represents the Antenna Gain of the base station 110. As shown in FIG. 4, the RSRP difference of the three co-site cells is used to derive the relative angle of first user equipment 121. This may be explained as follows: RSRP received by the first user equipment 121 is made up of several components: 1) reference signal power, i.e. how much power that is used by the base station 110 to send the RSRP; 2) power loss from feeders, connectors between the base station and the TX antennas; 3) antenna gain; 4) radio propagation loss, penetration loss, shadow fading. E.g. some Layer 1/Layer 3 filtering and hysteresis operation are used to combat with fast-fading as in 3GPP LTE system. For two neighboring co-site sectors, the components of 4) are the same, and the difference of component 1)+2) are known beforehand, so the RSRP difference mainly comes from the antenna gain difference of 3) from different cells. Since antenna gain differences depend on direction of departure at the base station 110, it may therefore be used to derive the relative angle of first user equipment 121. The resolution of the determination of the angle is rather coarse, a typical value is assumed to be 30 degrees. This means that a region may be defined as combination of TA range and RSRP range.

Combining TA and RSRP information, the snapshot positioning data is post-processed using specific filtering/smoothing algorithm to get more reliable result, which is however out of the scope of embodiments herein. By reusing the TA and RSRP information, the cell 115 coverage may be divided into multiple regions in a power efficient way. The RSRP+TA according to embodiments herein, which is required for regular cellular connection, implies that there is no need for always-on GPS monitoring, which in turn reduces user equipment power consumption in the first user equipment 121 and second user equipment 122.

Assigning Channel Resources to the Regions

In order to avoid inter-peer discovery resource collision, the first table may be pre-configured and sent to each master such as the first user equipment 121. As mentioned above, the first table comprises, for each region out of the number of regions, an indication of the assigned channel resource to use in that region for the process of discovering the D2D candidate user equipment. This may mean that the first table comprises a list of region—valid peer discovery recourses set association. When the first user equipment 121 is moving into a new region, it may utilize assigned channel resource corresponding to the new region in the first table. Neighbouring regions that interferes with each other do not use the same assigned channel resource subset, while regions not colliding with each other may reuse the same assigned channel resource subset for beacon signalling.

The assigned channel resources for beacon signalling may be geographically separated. As mentioned above, to increase the resource efficiency and power efficiency, the key point is to implement the beacon signal sending by masters such as the first user equipment 121, and the beacon signal receiving by slaves such as the second user equipment 122 in a scheduled way, but not random PDR selection as in prior art. In other words, the masters who are far from each other geographically may reuse the assigned channel resources for beacon signalling, while those masters near to each other may not. Considering the complicated collision relationship in distributed D2D networks, a practical method is a region-based scheduling of channel resources for beacon signalling according to embodiments herein.

Figure 5:
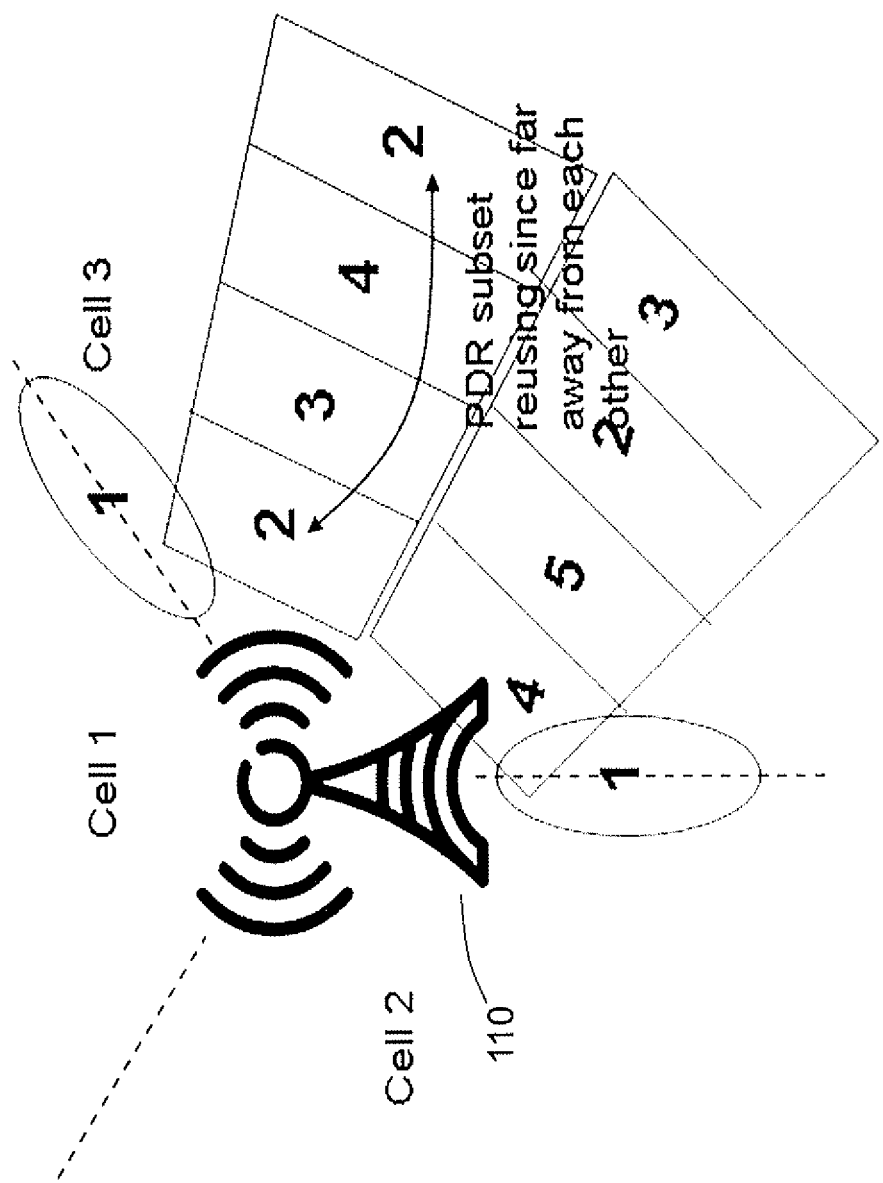
FIG. 5 is a schematic block diagram illustrating embodiments in a cellular communications network.

The mapping between region and the assigned channel resources for beacon signalling may be performed in different ways. There is a one-to-one mapping between the region and the valid assigned channel resources for beacon signalling. For example, a simple case is to divide the cell 115 coverage into three regions, i.e., region 1—cell center, region 2—cell medium and region 3—cell edge, each of which the range is characterized by the value of RSRP and TA. Also, there are three assigned channel resources for beacon signalling correspondingly, i.e., assigned channel resources 1, 2 and 3, for each of which the resource location is characterized by time, e.g., time slot, subframe no., and frequency, e.g., Resource Block (RB) index, channel index, location. FIG. 5 depicts an example of a region division and beacon signalling channel resources mapping of the base station 110, where the number indicates the assigned channel resources for beacon signalling in that region. Furthermore, when the region division is more accurate, e.g., 10 regions as depicted in FIG. 5, the channel resources for beacon signalling for a specific region is assigned by the base station 110 in a way that any two regions which are interfered with each other would not use the same channel resources for beacon signalling. Otherwise, reusing of channel resources for beacon signalling is allowed for non-interfered regions. Two regions which are colliding with each other are defined as two regions where one or more master user equipments in within one of the two regions and another one or more master user equipment within the other of the two regions would possibly interfere with each other.

The base station 110 may adjust region division adaptively to achieve more efficiency resource usage. This adjustment may be done by base station 110, based on the current load of master user equipments in the cell 115 but not limited to the information of load. For instance, when the load of masters in the cell 115 is lower than a pre-defined threshold, a coarser region division, i.e. the cell 115 being divided into fewer regions, is enough to avoid that assigned channel resources for beacon signalling are colliding. For example, only 2 regions—cell-edge/cell-center region. Yet if the load is higher than a pre-defined threshold, the region division would be further refined, i.e. the cell 115 being divided into more regions. i.e. in the example, more than 2 regions.

To Handle Intra-Region Collision

To handle intra-region collision of the assigned channel resources for beacon signalling, when there is one or more collisions between two or more master devices sending beacon signals using the same assigned channel resources detected by a slave device such as the second user equipment 122, the slave device reports it to its serving base station 110. To mitigate intra-region collision, the base station 110 may broadcast a revised first table, i.e. the region-valid assigned channel resources for beacon signalling, to the master and slave user equipments in the region including the first user equipment 121 and/or the second user equipment 122, to inform about an adjusted set of assigned channel resources for beacon signalling of this colliding region, comprising e.g. an increased number of assigned channel resources for beacon signalling to be used in the regions in the cell 115, to reduce collision probability. In this way, the intra-region PDR collision of the assigned channel resources for beacon signalling, is avoided and/or reduced in a re-active way.

An autonomous selection of an assigned channel resource for beacon signalling from the first table may be performed by the first user equipment 121 i.e. the master device, and the second user equipment 122 i.e. the slave device. Knowing the region division, the first user equipment 121 and/or the second user equipment 122 knows it is moving into a new region or staying in the present region. Only the assigned channel resource associated with the region the first user equipment 121 and/or the second user equipment 122 currently is located in may be used by the first user equipment 121 for beacon signalling, and by the second user equipment for receiving beacon signalling. The assigned channel resources for beacon signalling within a region may be pre-configured and sent to different masters beforehand. This method may largely reduce the cellular signalling, and may also fully avoid collision of the assigned channel resources when there are enough assigned channel resources for beacon signalling. When duplicate assigned channel resources for beacon signalling are utilized by different master devices comprising e.g. the first user equipment 121, i.e. when there are less assigned channel resources for beacon signalling than active master devices in the cell 115, collision of the assigned channel resources for beacon signalling may happen. Then it relies on the slave device such as the second user equipment 122 to report the collision to the base station 110, and to the base station 110 to adjust the number of assigned channel resources for beacon signalling accordingly, e.g. by increasing the number of available the available assigned channel resources for beacon signalling. This in order to alleviate any collision ahead and to reduce the collision probability. In this way, the intra-region collision of assigned channel resources for beacon signalling is avoided or reduced in a re-active way.

Assignment of the Channel Resources for Beacon Signalling:

The assigned channel resources for beacon signalling may be allocated by the base station 110 in a frequency domain first, so that the second user equipment 122 and other slave devices can monitor less time intervals, which is more power efficient. For example if limiting the assigned channel resources for beacon signalling on slot 1-5, the slaves may monitor the first slot only. The un-scheduled channel resources for beacon signalling may be used for other purposes, e.g., by cellular transmission.

Using the indicated set of channel resources, the first user equipment 121 sends beacon signals in an autonomous, e.g. APD way, and the second user equipment 122 and each other slave only monitors, i.e. scans the assigned channel resources for beacon signalling specific to its respective current region.

Thus, embodiments herein still uses the autonomous beacon signal sending and receiving procedure for peer discovery, which thus releases the cellular signalling burden for sending master information to slaves. With autonomous beacon signalling, the cellular network will not inform the slaves about the masters. Since the beacon signal sending and receiving is necessary for channel probing in a distributed network, it is beneficial to also rely on it for peer discovery, i.e. discovery of D2D candidate user equipments.

The second user equipment 122 and each slave in the cell 115, knowing which region it is in, may limit the monitored assigned channel resources for beacon signalling to the neighbouring region's assigned channel resources, in order for power saving. The assigned channel resources for beacon signalling of neighbouring regions may be sent by the base station 110 to the second user equipment 122 and any other slave in the cell 115 each time it moves into a new region via cellular request-response signalling, or the base station 110 may send the assigned channel resources for beacon signalling mapping for the region to the second user equipment 122 and the other slaves beforehand.

Figure 6:
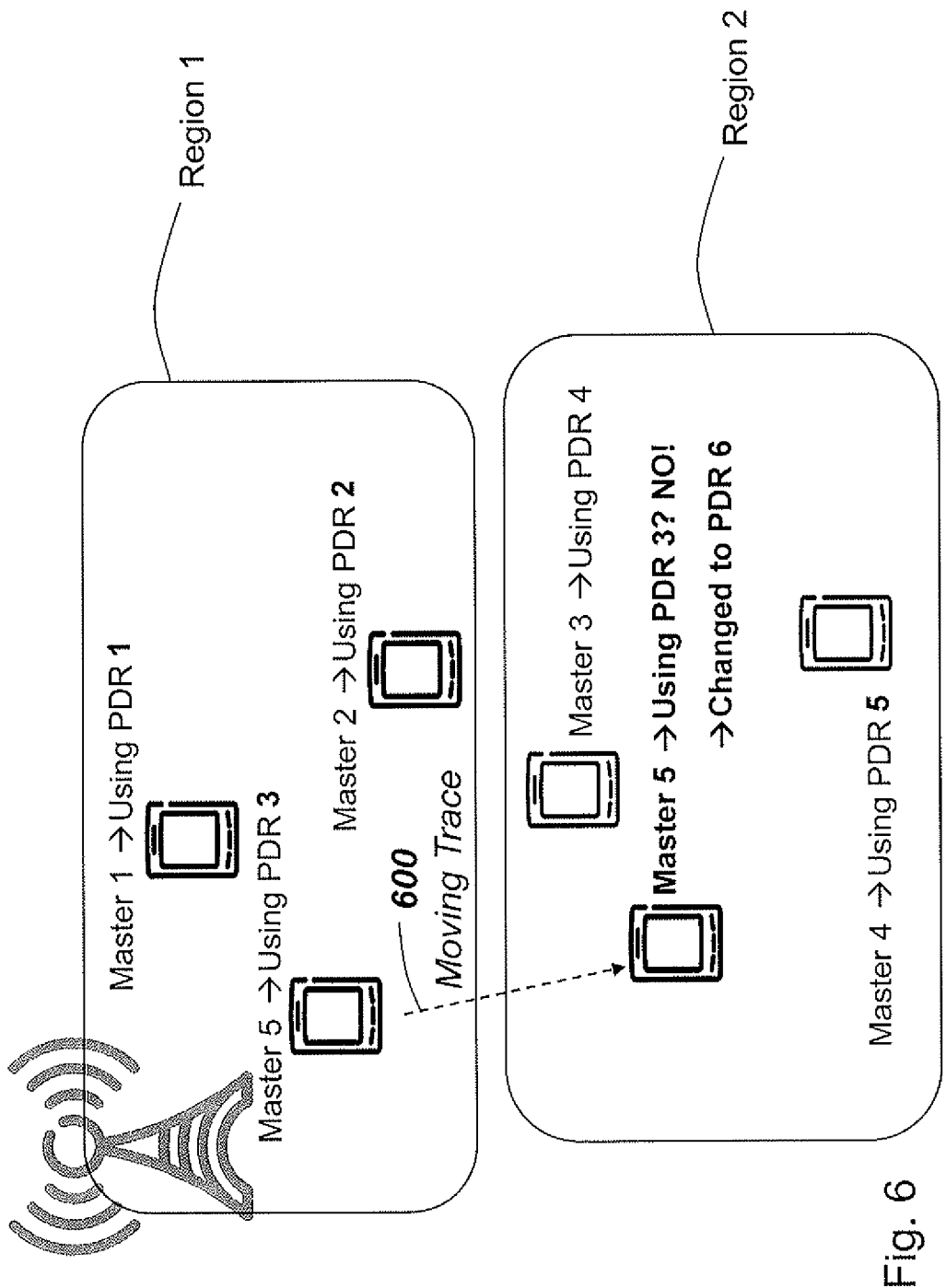
FIG. 6 is a schematic block diagram illustrating embodiments in a cellular communications network.

In the following, an embodiment of the signaling flow of the D2D peer discovery procedure in the LTE system is given, which is also shown in FIG. 6. FIG. 6 depicts beacon signalling channel resource assignment when the first user equipment, i.e. the master device is moving into a new region.

Action 601.

Before starting D2D communication, a D2D candidate e.g., Master 5, which in this example is the first user equipment 121, will attach to the cellular communications network 100 via cellular user equipment-base station signaling. During the procedure, the base station 110 sends the region division strategy to the D2D capable user equipments such as to the first user equipment and/or the second user equipment. The region division may be expressed in TA/RSRP based regions.

In this example scenario, LTE system TA is expressed in a value region of 0-1282, i.e., 11 bits, for random access, so it may be defined as
1) TA region1 for TA values between 0-200;
2) TA region2 for TA values between 201-400,
3) . . . .

In the LTE system, RSRP is expressed in a value region of −140~−44 dBm, so it may be defined as follows, the specific value setting should be based on antenna pattern:
1) RSRP region1 for Cell1_RSRP-Cell2_RSRP [0, 10] dBm & Cell1_RSRP-Cell3_RSRP [20, 30] dBm
2) RSRP region1 for Cell1_RSRP-Cell2_RSRP [10, 20] dBm & Cell1_RSRP-Cell3_RSRP [20, 30] dBm
3) . . .

Then the final region would be a combination of TA and RSRP region, e.g., Region1=TA region 1 & RSRP region1, Region 2=TA region 1 & RSRP region2.

Two example regions are shown in FIG. 6, region 1 and 2. This action corresponds to Action 200 and 201 described above.

Action 602.

When the first user equipment 121, i.e. Master 5 moves into a new region, see arrow 600, a different beacon signalling channel resource would be selected. For this master user equipment 121, the pre-configured mapping of region and beacon signalling channel resources are:
region1-PDR3, and region2-PDR6,
which is also sent to the first user equipment in Action 601 along with the region division information. Therefore, when the first user equipment 121 is in Region 1 it uses PDR 3, and when it moves into region 2, it would use PDR 6 autonomously.

Action 603.

The second user equipment 122 and each slave monitors the PDR subset of its own region and nearby regions. Once a master is found via received beacons, providing a service that a slave wishes to use, the peer discovery procedure is finished.

An advantage of embodiments herein is that this is still an autonomous peer discovery scheme, so there is no need for the base station 110 to notify all interested slave devices of the active master devices, which reduces the signaling overhead.

A further advantage of embodiments herein is that it provides a known region-based assignment of channel resources for beacon signals, so only orthogonality within each region is concerned, which reduces base station 110 complexity on allocating channel resources for beacon signals.

A further advantage of embodiments herein is that the region division is known, so less frequent user equipment reporting is needed, which reduces the signaling overhead.

Figure 7:
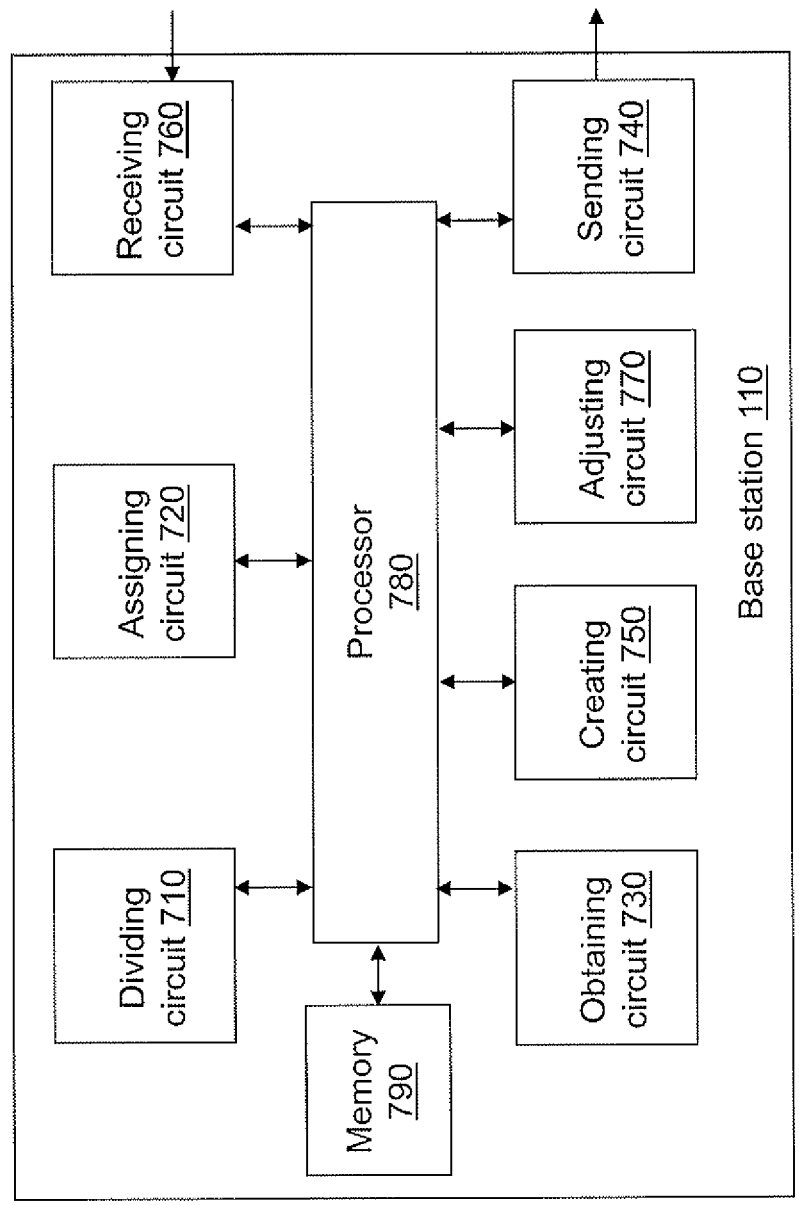
FIG. 7 is a schematic block diagram illustrating embodiments of a base station.

To perform the method actions for handling a process of discovering a candidate user equipment 120 for D2D communication in a cell 115 described above in relation to FIGS. 2 and 6, the base station 110, comprises the following arrangement depicted in FIG. 7. As mentioned above the cell 115 is served by the base station 110.

The base station 110 comprises a dividing circuit 710 configured to divide the cell 115 into a number of regions.

The dividing circuit 710 may further be configured to divide the cell 115 into the number of regions based on information about timing advance in the cell 115 and information about reference signal received power of the cell 115.

In some embodiments, the dividing circuit 710 further is configured to divide the cell 115 into the number of regions based on positioning information obtained by monitoring Global Positioning System, GPS, signals. The positioning information may be received from user equipments in the cell monitoring Global Positioning System, GPS, signals The number of regions that the cell 115 is divided into may be based on and/or revised based on the number of user equipments in the cell 115 from which the base station 110 has received an indication of having D2D capability.

The dividing circuit 710 may further be configured to divide the cell 115 into the number of regions such that a coverage area of the cell 115 is divided into sectorized rings, wherein each sectorized ring represents a region.

The base station 110 further comprises a an assigning circuit 720 configured to assign to each one out of the number of regions, a channel resource for use in the region for sending beacon signals in the process of discovering the D2D candidate user equipment.

The assigning circuit 720 may further be configured to assign different channel recourses to colliding regions out of the number of regions. The assigning circuit 720 may further be configured to assign same channel recourses to not colliding regions out of the number of regions.

In some embodiments, the base station 110 comprises an obtaining circuit 730 configured to obtain a first table comprising, for each region out of the number of regions, an indication of the assigned channel resource to use in that region for the process of discovering the D2D candidate user equipment.

In some embodiments, the base station 110 further comprises a sending circuit 740 which may be configured to send the first table to a first user equipment 121 when the base station 110 has received an indication that the first user equipment 121 has D2D capability.

The base station 110 may further comprise a creating circuit 750 configured to create a second table comprising, for each region out of the number of regions, an indication of a border line of the region.

In these embodiments, the sending circuit 740 may further be configured to send the second table to the first user equipment 121 when the base station 110 has received an indication that the first user equipment 121 has D2D capability.

The base station 110 further comprises a receiving circuit 760 configured to receive a report from the second user equipment 122 comprised in the cell 115. The report comprises information about two or more user equipments colliding by using the same channel resource for sending beacon signals within the same region.

The base station 110 may further comprise an adjusting circuit 770 configured to adjust the first table and/or the second table based on the information in the received report.

The adjusting circuit 770 may further be configured to adjust the first table and/or the second table by increasing the number of available channel recourses in one of the regions out of out of the number of regions in the cell 115.

In some embodiments, the adjusting circuit 770 further is configured to adjust the first table and/or the second table by dividing the cell into an increased number of regions in the cell 115.

The sending circuit 740 may further be configured to send the adjusted first table and/or the adjusted second table to the first user equipment 121 from which the base station 110 has received an indication that the first user equipment 121 has D2D capability.

In some embodiments, the sending circuit 740 further is configured to send to the second user equipment 122, any one out of the first table, the second table, the adjusted first table and/or the adjusted second table.

The embodiments herein handling the process of discovering a candidate user equipment for D2D communication in a cell 115 may be implemented through one or more processors, such as a processor 780 in the base station 110 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 790 comprising one or more memory units. The memory 790 is arranged to be used to store information obtained from the first and second user equipment 121, 122, the region and their border lines, the assigned channel resources for sending beacon signals, the first table and the second table, the adjusted first table and/or the adjusted second table, data, configurations, schedulings, and applications to perform the methods herein when being executed in the base station 110.

Those skilled in the art will also appreciate that the dividing circuit 710, the assigning circuit 720, the obtaining circuit 730, the sending circuit 740, the creating circuit 750, the receiving circuit 760, and the adjusting circuit 770 described above may refer to a combination of analog and digital circuits, and/or one or more processors configured with software and/or firmware, e.g. stored in a memory, that when executed by the one or more processors such as the processor 780 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Method in the First user Equipment 121

Figure 8:
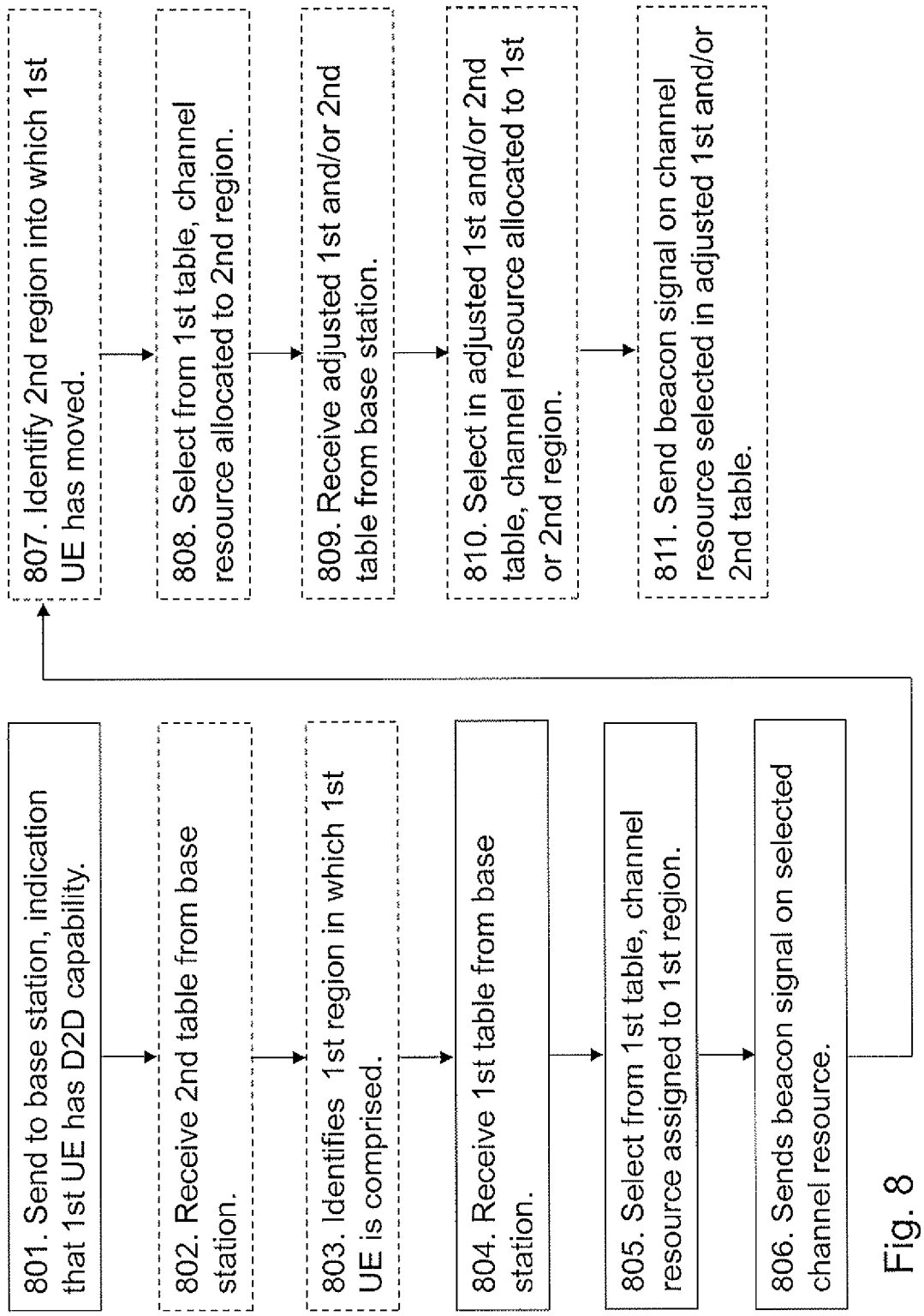
FIG. 8 is a flowchart depicting embodiments of a method in a first user equipment.

An example of embodiments of a method in the first user equipment 121 for handling the process of discovering a candidate user equipment for D2D communication in the cell 115, will now be described with reference to a flowchart depicted in FIG. 8. As mentioned above, the first base station 121 may be a master device. The cell 115 is divided into a number of regions. The method comprises the following actions, which actions may be taken in any suitable order. Dashed lines of some boxes in FIG. 8 indicate that this action is not mandatory.

Action 801

The first user equipment 121 sends to the base station 110, an indication that the first user equipment 121 has D2D capability.

Action 802

When the base station 110 has received the indication, it may sends the first table to the user equipment 121. Thus the first user equipment 121 may receive the second table from the base station 110. The second table comprises, for each region out of the number of regions, an indication of a border line of the region.

Action 803

The first user equipment 121 identifies a first region out of the number of regions in which the first user equipment 121 is comprised. This is performed by retrieving in the second table, the region indicating a border line comprising the geographical position of the first user equipment 121.

Action 804

When the base station 110 has received the indication, it sends the first table to the user equipment 121. Thus the first user equipment 121 receives the first table from the base station 110. The first table comprises for each region out of the number of regions, an assigned channel resource to use in that region.

In some embodiments, the base station 110 may send the first table to the first user equipment 121 and other master devices before peer discovery started.

Action 805

After sending the first table to the first user equipment 121 and the other master devices in the cell 115, it is up to the first user equipment 121 and the other master devices to detect their respective region, by means of the first table, for example based on the RSRP and TA information. Thus the first user equipment 121 selects from the first table, a channel resource that is assigned to a first region out of the number of regions. The first region is associated with the geographical position of the first user equipment 121.

Action 806

The first user equipment 121 sends a beacon signal on the selected channel resource. The beacon signal is to be received by slave devices such as the second user equipment 122. The beacon signal is sent to announce that the first user equipment 121 is a candidate user equipment for D2D communication.

This may imply that, by using the assigned and selected beacon signaling channel resources, the first user equipment 121 sends beacon signals in an Autonomous Peer Discovery (APD) way, and the second user equipment and other slave devices 122 only monitors, e.g. scans, the beacon signalling channel resource specific to its current region and possibly neighbour regions.

Action 807

The first user equipment 121 may move into another geographical position in the cell 115. In these embodiments, the first user equipment 121 identifies a second region out of the number of regions into which the first user equipment 121 has moved. This is performed by retrieving in the second table, the region indicating a border line comprising the geographical position of the first user equipment 121 when it has moved.

Action 808

In some embodiments, it is up to the first user equipment 121 to detect the change to a new region, by means of the first table, e.g. based on the RSRP and TA information. Thus the first user equipment 121 may select from the first table, a channel resource that is allocated to the second region, which channel resource is for sending of the beacon signal.

Action 809

The first user equipment 121 may receive an adjusted first table and/or an adjusted second table from the base station 110.

The adjusted first table and/or adjusted second table may be adjusted based on a report from the second user equipment 122 to the base station 110. The report may comprise information about two or more user equipments colliding by using the same channel resource for sending beacon signals within the same region.

Action 810

The first user equipment 121 may select by means of the adjusted first table and/or adjusted second table, a channel resource that is allocated to the first region or the second region out of the number of regions.

Action 811

The first user equipment 121 may then send a beacon signal on the channel resource selected by means of the adjusted first table and or adjusted second table.

Figure 9:
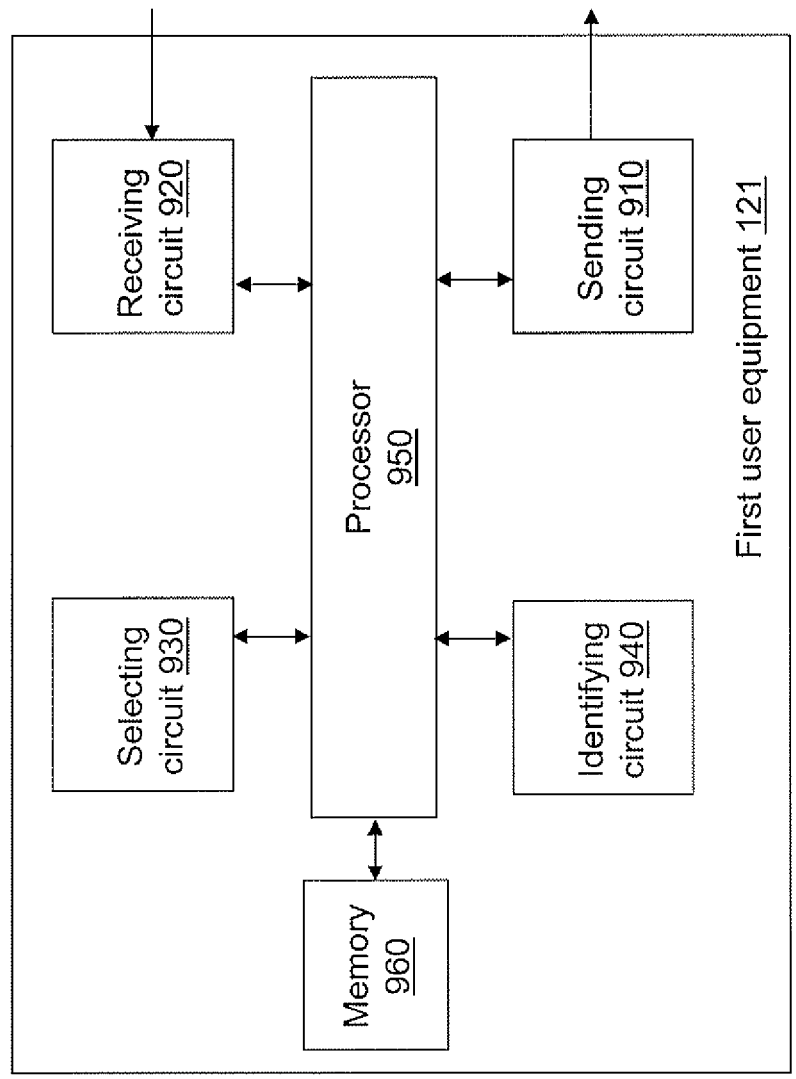
FIG. 9 is a schematic block diagram illustrating embodiments of a first user equipment.

To perform the method actions for handling a process of discovering a candidate user equipment for D2D communication in a cell 115 described above in relation to FIG. 8, the first user equipment 121 comprises the following arrangement depicted in FIG. 9. As mentioned above the cell 115 is arranged to be divided into a number of regions.

The first user equipment 121 comprises a sending circuit 910 configured to send to the base station 110, an indication that the first user equipment 121 has D2D capability.

The sending circuit 910 further is configured to send a beacon signal on the selected channel resource. The beacon signal is to be received by a second user equipment 122 slave. The beacon signal is sent to announce that the first user equipment 121 is a user equipment candidate user equipment for D2D communication.

In some embodiments, the sending circuit 910 further is configured to send the beacon signal on the channel resource selected by means of an adjusted first table and or adjusted second table.

The first user equipment 121 further comprises a receiving circuit 920 configured to receive from the base station 110 when the base station 110 has received the indication, a first table comprising, for each region out of the number of regions, an assigned channel resource to use in that region.

The receiving circuit 920 further may be configured to receive from the base station 110 when the base station 110 has received the indication, a second table comprising, for each region out of the number of regions, an indication of a border line of the region.

In some embodiments, the receiving circuit 920 further is configured to receive the adjusted first table and/or the adjusted second table from the base station 110.

The first user equipment 121 further comprises a selecting circuit 930 configured to select from the first table, a channel resource that is assigned to a first region out of the number of regions. The first region is associated with the geographical position of the first user equipment 121.

In some embodiments, the selecting circuit 930 further is configured to select by means of the adjusted first table and/or adjusted second table, a channel resource that is allocated to the first region or the second region out of the number of regions.

In some embodiments, the first user equipment 121 comprises an identifying circuit 940 configured to identify a first region out of the number of regions in which the first user equipment 121 is comprised. This may be performed by retrieving in the second table, the region indicating a border line comprising the geographical position of the first user equipment 121.

In some embodiments, the first user equipment 121 is arranged to move into another geographical position in the cell 115. In these embodiments, the identifying circuit 940 may further be configured to identify a second region out of the number of regions into which the first user equipment 121 has moved, by retrieving in the second table, the region indicating a border line comprising the geographical position of the first user equipment 121 when it has moved. In these embodiments, the selecting circuit 930 may further be configured to select from the first table, a channel resource that is allocated to the second region, which channel resource is for sending of the beacon signal.

The embodiments herein for handling a process of discovering a candidate user equipment for D2D communication in a cell 115 may be implemented through one or more processors, such as a processor 950 in the first user equipment 121 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first user equipment 121. One such carrier may be in the form of a CD ROM disc. It is however feasible with other data carriers such as a memory stick. The computer program code may furthermore be provided as pure program code on a server and downloaded to the first user equipment 121.

The first user equipment 121 may further comprise a memory 960 comprising one or more memory units. The memory 960 is arranged to be used to store the indication about D2D capability to be sent to the base station 110, the first table, the second table, the adjusted first table and/or the adjusted second, data, configurations, schedulings, and applications to perform the methods herein when being executed in the first user equipment 121.

Those skilled in the art will also appreciate that the sending circuit 910, receiving circuit 920, the selecting circuit 930, and the identifying circuit 940 described above may refer to a combination of analog and digital circuits, and/or one or more processors configured with software and/or firmware, e.g. stored in a memory, that when executed by the one or more processors such as the processor 950 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Method in the Second user Equipment 122

Figure 10:
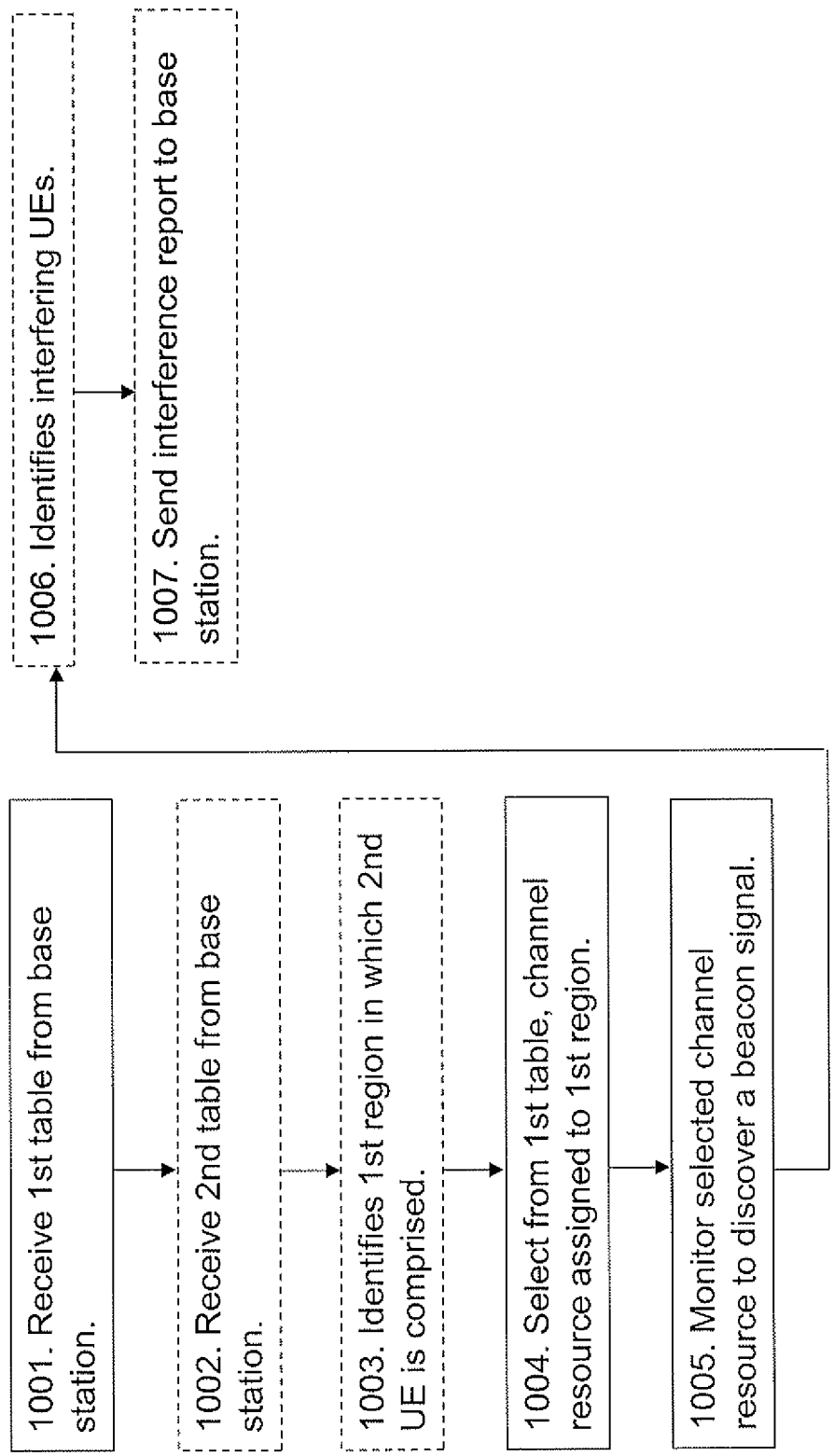
FIG. 10 is a flowchart depicting embodiments of a method in a second user equipment.

An example of embodiments of a method in the second user equipment 122 for handling a process of discovering a candidate user equipment for D2D communication in a cell 115, will now be described with reference to a flowchart depicted in FIG. 10. As mentioned above the cell 115 is divided into a number of regions. Further, the second user equipment 122 may be a slave device. The method comprises the following actions, which actions may be taken in any suitable order. Dashed lines of some boxes in FIG. 6 indicate that this action is not mandatory.

Action 1001

The second user equipment 122 receives a first table from the base station 110. The first table comprises for each region out of the number of regions, an assigned channel resource to use in that region.

Action 1002

In some embodiments, the second user equipment 122 receives a second table from the base station 110. The second table comprises, for each region out of the number of regions, an indication of a border line of the region.

Action 1003

The second user equipment 122 identifies the first region in which the second user equipment 122 is comprised, out of the number of regions. This is performed by retrieving in the second table, the region indicating a border line comprising the geographical position of the second user equipment 122.

This action may further comprise identifying one or more second regions out of the number of regions, by retrieving in the second table, the regions indicating a respective border line of a region being neighbour regions to the first region. The one or more second regions are neighbour regions to the first region.

Action 1004

The second user equipment 122 selects from the first table, a channel resource that is assigned to a first region out of the number of regions. The first region is associated with the geographical position of the second user equipment 122.

This action may further comprise, selecting the channel resource that is assigned to one or more second regions out of the number of regions.

Action 1005

The second user equipment 122 monitors the selected channel resource to discover a beacon signal from a first user equipment 121. The beacon signal announces that the first user equipment 121 is a candidate user equipment for D2D communication.

Action 1006

In some embodiments, the second user equipment 122 identifies that two or more user equipments are colliding by using the same channel resource for sending beacon signals within the same region.

Action 1007

The second user equipment 122 may then send a report to the base station 110. The report comprises information about said identified colliding.

Figure 11:
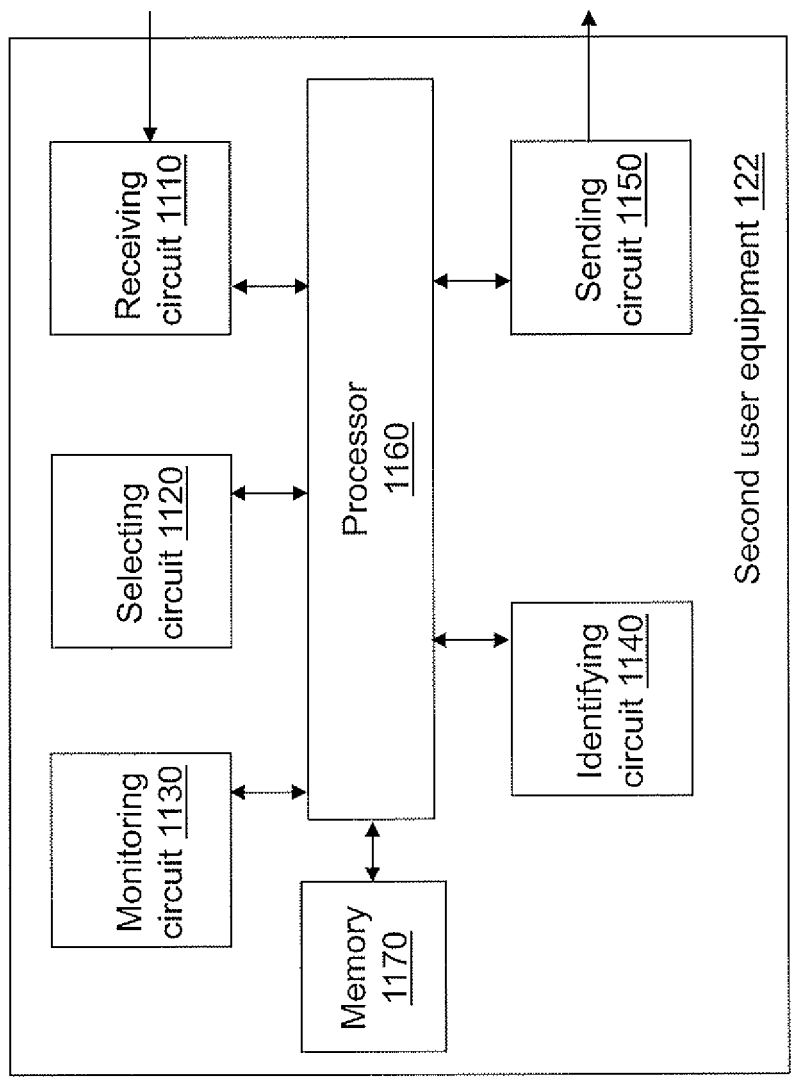
FIG. 11 is a schematic block diagram illustrating embodiments of a second user equipment.

To perform the method actions for handling a process of discovering a candidate user equipment for D2D communication in a cell 115, described above in relation to FIG. 10, the second user equipment 122 comprises the following arrangement depicted in FIG. 11. As mentioned above cell 115 is divided into a number of regions. Further the second user equipment 122 may be a slave device.

The second user equipment 122 comprises a receiving circuit 1110 configured to receive a first table from a base station 110. The first table comprises for each region out of the number of regions, an assigned channel resource to use in that region.

In some embodiments, the receiving circuit 1110 further is configured to receive a second table from the base station 110. The second table comprises for each region out of the number of regions, an indication of a border line of the region.

The second user equipment 122 further comprises a selecting circuit 1120 configured to select from the first table, a channel resource that is assigned to a first region out of the number of regions. The first region is associated with the geographical position of the second user equipment 122.

The selecting circuit 1120 may further be configured to select from the first table a channel resource that is assigned to one or more second regions out of the number of regions, and wherein the one or more second regions are neighbour regions to the first region.

The second user equipment 122 further comprises a monitoring circuit 1130 configured to monitor the selected channel resource to discover a beacon signal from a first user equipment 121. The beacon signal announces that the first user equipment 121 is a candidate user equipment for D2D communication.

For example, by using the selected channel resource, each master device sends beacon signals in an APD way, and each slave device only monitors such as scans the selected channel resource specific to its current region and possibly in a neighbouring region.

The second user equipment 122 may further comprise an identifying circuit 1140 configured to identify the first region in which the second user equipment 122 is comprised out of the number of regions, by retrieving in the second table, the region indicating a border line comprising the geographical position of the second user equipment 122.

The identifying circuit 1140 may further be configured to identify the one or more second regions out of the number of regions. This may be performed by retrieving in the second table, the regions indicating a respective border line of a region being neighbour regions to the first region.

In some embodiments, the identifying circuit 1140 may further be configured to identify that two or more user equipments are colliding by using the same channel resource for sending beacon signals within the same region.

The second user equipment 122 further comprises a sending circuit 1150 which may be configured to send a report to the base station 110. The report comprises information about said identified colliding.

The embodiments herein for handling a process of discovering a candidate user equipment for D2D communication in a cell 115, may be implemented through one or more processors, such as a processor 1160 in the second user equipment 122 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the second user equipment 122. One such carrier may be in the form of a CD ROM disc. It is however feasible with other data carriers such as a memory stick. The computer program code may furthermore be provided as pure program code on a server and downloaded to the second user equipment 122.

The second user equipment 122 may further comprise a memory 1170 comprising one or more memory units. The memory 1170 is arranged to be used to store the first table, the second table, the adjusted first table and/or the adjusted second, data, configurations, schedulings, and applications to perform the methods herein when being executed in the second user equipment 122.

Those skilled in the art will also appreciate that the receiving circuit 1110, the selecting circuit 1120, the monitoring circuit 1130, the identifying circuit 1140 and, the sending circuit 1150 described above may refer to a combination of analog and digital circuits, and/or one or more processors configured with software and/or firmware, e.g. stored in a memory, that when executed by the one or more processors such as the processor 1160 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a base station for handling a process of discovering a candidate user equipment for Device to Device, D2D, communication in a cell, which cell is served by the base station, the method comprising:
receiving, from a first user equipment, an indication that the first user equipment has D2D capability;
dividing a geographic area of the cell into a number of geographic regions;
assigning to each one of the number of geographic regions, a D2D channel resource for D2D use in the geographic region for sending D2D beacon signals in the process of discovering the D2D candidate user equipment, wherein the assigning is performed such that: different D2D channel resources are assigned to colliding geographic regions out of the number of regions and same D2D channel resources are assigned to not colliding geographic regions out of the number of regions;
sending, to the first user equipment, a first table comprising, for each geographic region of the number of geographic regions, the assigned D2D channel resource for D2D use in the geographic region; and
sending, to the first user equipment, a second table comprising, for each geographic region of the number of geographic regions, an indication of a border line of the geographic region,
wherein the first table identifies a first D2D channel resource to be used by the first user equipment for sending a D2D beacon signal when the first user equipment is associated with a geographical position in the first region, the D2D beacon signal to announce to a second user equipment that the first user equipment is a candidate user equipment for D2D communication,
wherein the second table identifies a border line for a second geographic region to which the first user equipment has moved, and
wherein the first table identifies a second D2D channel resource to be used by the first user equipment for sending the D2D beacon signal when the first user equipment has moved to a geographical position in the second region.

2. The method according to claim 1, wherein the dividing the cell into the number of regions, is based on information about timing advance in the cell and information about reference signal received power of the cell.

3. The method according to claim 1, wherein the dividing the cell into the number of regions, is based on positioning information received from user equipments in the cell monitoring Global Positioning System, GPS, signals.

4. The method according to claim 1, wherein the dividing the cell into the number of regions, is performed such that a coverage area of the cell is divided into sectorized rings, wherein each sectorized ring represents a region.

5. The method according to claim 1, wherein the number of regions that the cell is divided into is based on and/or revised based on the number of user equipments in the cell from which the base station has received an indication of having D2D capability.

6. The method according to claim 1, further comprising:
obtaining the first table comprising, for each region out of the number of regions, an indication of the assigned D2D channel resource to use in that region for the process of discovering the D2D candidate user equipment,
sending the first table to the first user equipment when the base station has received an indication that the first user equipment has D2D capability.

7. The method according to claim 6, further comprising:
creating the second table comprising, for each region out of the number of regions, the indication of the border line of the region,
sending the second table to the first user equipment when the base station has received an indication that the first user equipment has D2D capability.

8. The method according to claim 7, further comprising:
receiving a report from a second user equipment comprised in the cell, which report comprises information about two or more user equipments colliding by using the same D2D channel resource for sending D2D beacon signals within the same region, and
adjusting the first table and/or the second table based on the information in the received report.

9. A method in a first user equipment for handling a process of discovering a candidate user equipment for Device to Device, D2D, communication in a cell, which a geographic area of a cell is divided into a number of geographic regions, and which cell is served by a base station, the method being characterized in comprising:
sending to the base station, an indication that the first user equipment has D2D capability,
receiving from the base station when the base station has received the indication, a first table comprising, for each geographic region out of the number of geographic regions, an assigned D2D channel resource for D2D use in that geographic region,
selecting from the first table, a D2D channel resource that is assigned to a first region out of the number of geographic regions for D2D wherein the first region is associated with the geographical position of the first user equipment, and
sending a D2D beacon signal on the selected D2D channel resource, which D2D beacon signal is to be received by a second user equipment and which D2D beacon signal is sent to announce that the first user equipment is a candidate user equipment for D2D communication,
wherein the first user equipment moves into another geographical position in the cell and the method further comprises:
identifying a second region out of the number of geographic regions into which the first user equipment has moved, by retrieving in a second table, the region indicating a border line comprising the geographical position of the first user equipment when it has moved, and
selecting from the first table, a D2D channel resource that is allocated to the second region, which D2D channel resource is for sending of the D2D beacon signal.

10. The method according to claim 9, further comprising:
receiving from the base station when the base station has received the indication that the first user equipment has D2D capability, the second table comprising, for each region out of the number of geographic regions, an indication of a border line of the region,
identifying the first region out of the number of geographic regions in which the first user equipment is comprised, by retrieving in the second table, the first region indicating the border line comprising the geographical position of the first user equipment.

11. The method according to claim 9, further comprising:
receiving from the base station, an adjusted first table and/or an adjusted second table,
selecting by means of the adjusted first table and/or adjusted second table, a D2D channel resource that is allocated to the first region or the second region out of the number of geographic regions,
sending the D2D beacon signal on the D2D channel resource selected by means of the adjusted first table and or adjusted second table.

12. A base station for handling a process of discovering a candidate user equipment for Device to Device, D2D, communication in a cell, which cell is served by the base station, the base station comprising:
a receiving circuit configured to receive, from a first user equipment, an indication that the first user equipment has D2D capability;
a dividing circuit configured to divide a geographic area of the cell into a number of geographic regions:
an assigning circuit configured to assign to each one of the number of geographic regions, a D2D channel resource for D2D use in the geographic region for sending D2D beacon signals in the process of discovering the D2D candidate user equipment, wherein the assigning circuit further is configured to assign: different D2D channel resources to colliding geographic regions out of the number of regions and same D2D channel resources to not colliding geographic regions out of the number of region;
a sending circuit configured to send, to the first user equipment:
a first table comprising, for each geographic region of the number of geographic regions, the assigned D2D channel resource for D2D use in the geographic region; and
a second table comprising, for each geographic region of the number of geographic regions, an indication of a border line of the geographic region;
wherein the first table identifies a first D2D channel resource to be used by the first user equipment for sending a D2D beacon signal when the first user equipment is associated with a geographical position in the first region, the D2D beacon signal to announce to a second user equipment that the first user equipment is a candidate user equipment for D2D communication,
wherein the second table identifies a border line for a second region to which the first user equipment has moved, and
wherein the first table identifies a second D2D channel resource to be used by the first user equipment for sending the D2D beacon signal when the first user equipment has moved to a geographical position in the second region.

13. The base station according to claim 12, wherein the dividing circuit further is configured to divide the cell into the number of regions based on information about timing advance in the cell and information about reference signal received power of the cell.

14. The base station according to claim 12, wherein the dividing circuit further is configured to divide the cell into the number of regions based on positioning information received from user equipments in the cell monitoring Global Positioning System, GPS, signals.

15. The base station according to claim 12, wherein the dividing circuit further is configured to divide the cell into the number of regions such that a coverage area of the cell is divided into sectorized rings, wherein each sectorized ring represents a region.

16. The base station according to claim 12, wherein the number of regions that the cell is divided into is based on and/or revised based on the number of user equipments in the cell from which the base station has received an indication of having D2D capability.

17. The base station according to claim 12, further comprising
an obtaining circuit configured to obtain the first table comprising, for each region out of the number of regions, an indication of the assigned D2D channel resource for D2D use in that region for the process of discovering the D2D candidate user equipment, and
a sending circuit configured to send the first table to the first user equipment when the base station has received the indication that the first user equipment has D2D capability.

18. The base station according to claim 17, further comprising:
a creating circuit configured to create the second table comprising, for each region out of the number of regions, the indication of the border line of the region,
and wherein the sending circuit further is configured to send the second table to the first user equipment when the base station has received the indication that the first user equipment has D2D capability.

19. The base station according to claim 18, further comprising:
a receiving circuit configured to receive a report from a second user equipment comprised in the cell, which report comprises information about two or more user equipments colliding by using the same D2D channel resource for sending D2D beacon signals within the same region, and
an adjusting circuit configured to adjust the first table and/or the second table based on the information in the received report.

20. A first user equipment for handling a process of discovering a candidate user equipment for Device to Device, D2D, communication in a cell, which a geographic area of a cell is arranged to be divided into a number of geographic regions, and which cell is served by a base station, the first user equipment characterized in comprising:
a sending circuit configured to send to the base station, an indication that the first user equipment has D2D capability,
a receiving circuit configured to receive from the base station when the base station has received the indication, a first table comprising, for each region out of the number of geographic regions, an assigned D2D channel resource for D2D use in that region,
a selecting circuit configured to select from the first table, a D2D channel resource that is assigned to a first region out of the number of geographic regions,
wherein the first region is associated with the geographical position of the first user equipment,
wherein the sending circuit further is configured to send a D2D beacon signal on the selected D2D channel resource, which beacon signal is to be received by a second user equipment and which D2D beacon signal is sent to announce that the first user equipment is a user equipment candidate user equipment for D2D communication, wherein when the first user moves into another geographical position in the cell:
the identifying circuit further is configured to identify a second region out of the number of geographic regions into which the first user equipment has moved, by retrieving in the second table, the second region indicating a border line comprising the geographical position of the first user equipment when it has moved, and
the selecting circuit further is configured to select from the first table, a D2D channel resource that is allocated to the second region, which D2D channel resource is for sending of the beacon signal.

21. The first user equipment according to claim 20, wherein the receiving circuit further is configured to receive from the base station when the base station has received the indication that the first user equipment has D2D capability, the second table comprising, for each region out of the number of geographic regions, an indication of a border line of the region,
the first user equipment comprising an identifying circuit configured to identify the first region out of the number of geographic regions in which the first user equipment is comprised, by retrieving in the second table, the first region indicating a border line comprising the geographical position of the first user equipment.

22. The first user equipment according to claim 20,
wherein the receiving circuit further is configured to receive from the base station, an adjusted first table and/or an adjusted second table,
wherein the selecting circuit further is configured to select by means of the adjusted first table and/or adjusted second table, a D2D channel resource that is allocated to the first region or the second region out of the number of geographic regions,
wherein the sending circuit further is configured to send the D2D beacon signal on the D2D channel resource selected by means of the adjusted first table and or adjusted second table.

* * * * *